July 10, 1973 K. D. JEFFS 3,745,038
POLYOLEFIN FILM MATERIAL
Filed April 15, 1971
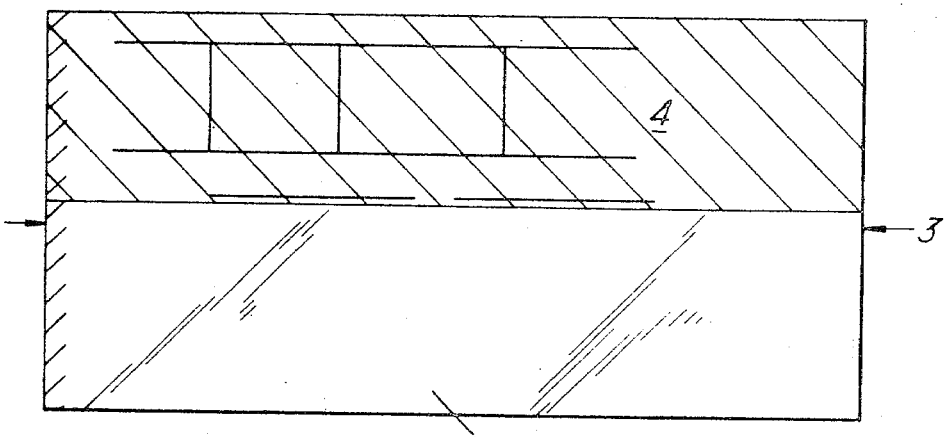
Fig. 1.
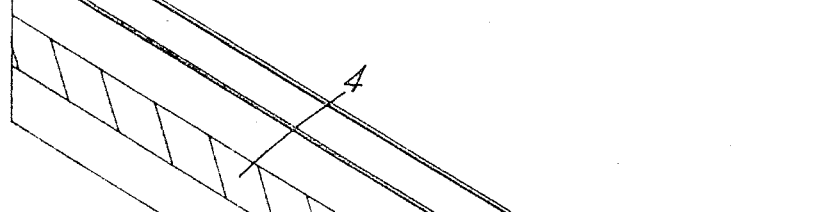
Fig. 2.
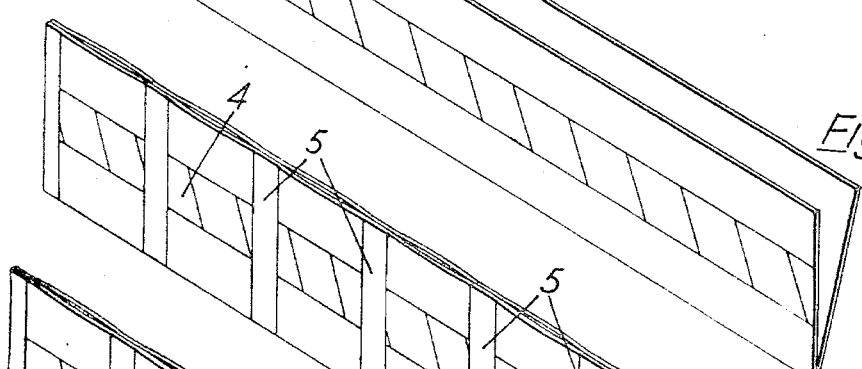
Fig. 3.
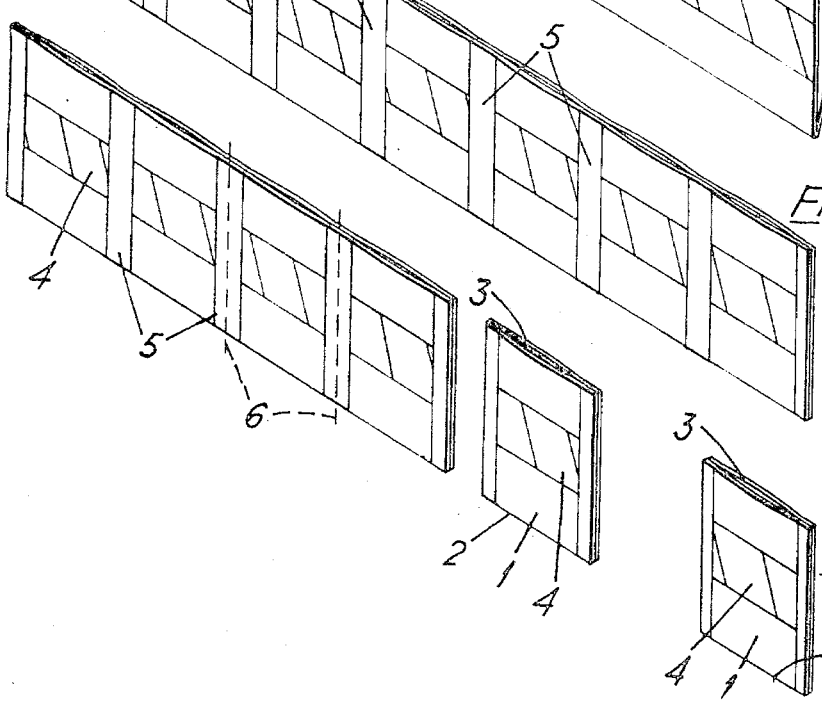
Fig. 4. Inventor
KEITH D. JEFFS ered July 10, 1973

3,745,038
POLYOLEFIN FILM MATERIAL
Keith Derek Jeffs, Waterlooville, England, assignor to
The Metal Box Company Limited, London, England
Filed Apr. 15, 1971, Ser. No. 134,263
Int. Cl. B32b 27/30; B44d 1/092
U.S. Cl. 117—47 A
3 Claims

ABSTRACT OF THE DISCLOSURE

Polyolefin film material is, at least in part, rendered receptive to writing media by first oxidising a surface of the material and then coating the oxidised surface with a coating composition which comprises a polymer dispersion of a copolymer of vinyl acetate with an alkyl acrylate added to a titanium dioxide pigment and a particulate filler. A primer coating may be applied between the oxidised surface and the coating composition.

BACKGROUND OF THE INVENTION

(1) Field of the invention

This invention relates to polyolefin film material on which, as will be well understood, it is difficult to write and which is not receptive to liquid or stamping inks.

(2) Description of the prior art

It has been proposed to overcome this difficulty by securing paper labels to selected areas of polyolefin film bags and it is one object of the present invention to avoid the use of such labels. It has also been proposed to provide polyolefin bags with printed areas which can be marked with a pencil or with ball point pen inks but such areas are not receptive to liquid or stamping inks and it is a further object of the invention to provide polyolefin material which overcomes this inadequacy.

SUMMARY

According to the invention there is provided polyolefin film material having a part at least of a surface thereof rendered receptive to writing media such as the "lead" or graphite of a pencil, ball pen inks, liquid inks, stamping inks, and typewriter ribbon inks by oxidation thereof and a coating composition applied to the oxidised surface and comprising a polymer dispersion of the polyvinyl acetate type or of a copolymer of vinyl acetate with an alkyl acrylate added to a titanium dioxide pigment and a particulate filler. If desired a primer coating may be applied beween the oxidised part and the coating composition.

Also comprehended is a method of producing the film material according to the invention which method comprises the steps of preparing a coating composition by grinding a mixture of titanium dioxide pigment, a particulate filler, water, and a stabilising dispersion agent to a maximum pigment size of 1 to 30 microns, and mixing with the mixture a polymer dispersion of a copolymer of vinyl acetate with an alkyl acrylate, oxidising said part of the surface of the film material, coating the oxidised surface with the composition, and drying the applied coating. In a preferred embodiment the maximum pigment size is 1 to 10 microns.

The particulate filler may be a white particulate filler selected from the group china clay, precipitated chalk, talc, and whiting.

The percentage composition by weight of the coating composition is pigment, 10 to 35%; filler, 30 to 50%; water, 30 to 40%; dispersing agent, 2 to 5%; and polymer dispersion, 25 to 35%.

The method may include the step of applying a primer coating to the oxidated surface prior to the application of the coating composition. The primer coating may be of the polyethylene imine type in a water/methylated spirits solution, and the application weight of the primer coating be in the range 0.05 to 0.15 gram per square metre.

Alternatively, the primer coating may be of the polyurethane type in a solvent such as acetone, methyl ethyl ketone, or ethyl acetate. The application of this coating may be in the range 0.05 to 0.5 gram per square metre and preferably in the range 0.1 to 0.2 gram per square metre.

The weight of dry coating composition on the material is in the range 5 to 20 grams per square metre, and preferably in the range 8 to 13 grams per square metre.

Also comprehended is the provision of bags, envelopes or the like made from polyolefin film material according to the invention, and in particular a bag which is of elongate generally rectangular form in which the coating composition is applied as a band extending lengthwise of one outer side only of the bag.

BRIEF DESCRIPTION OF THE DRAWINGS

FIG. 1 is a plan of one kind of bag made from polyolefin film material according to the invention, and FIGS. 2 to 4 illustrate the method of making another kind of bag from polyolefin film material according to the invention.

DESCRIPTION OF THE PREFERRED EMBODIMENTS

Referring to FIG. 1, a bag 1 is made of polyolefin film material and is of elongate generally rectangular form and has a bottom 2 sealed in any suitable manner, as by a heat seal, and an open end 3. One use to which the bag may be put is to contain bank notes. A band 4 of coating material, described below, extends lengthwise of one outer face of the bag. As shown in the drawing the band 4 extends partly across the bag from one longitudinal edge thereof but it will be understood that the band 4 may occupy a different position, and that, if desired, the coating composition may extend completely across the face of the bag, or across both outer faces of the bag. If desired the bag may, in known manner, have gusseted sides.

The coating composition has an absorption characteristic which renders it receptive to writing media such as the "lead" or graphite of a pencil, ball pen inks, liquid inks, stamping inks, and typewriter ribbon inks and comprises a polymer dispersion of the polyvinyl acetate type or of a copolymer of vinyl acetate with an alkyl acrylate added to a titanium dioxide pigment having a rutile form and a particulate filler. In preparing the coating composition dispersing agents may be included to improve the stability of the composition and water may be included as a diluent. The titanium dioxide pigment may be any titanium dioxide having a rutile form, that currently sold by British Titan Products Limited as Tioxide R.XL being particularly suitable.

The filler may be any white particulate material such as china clay, precipitated chalk, talc, or whiting and the dispersing agent may be sodium metaphosphate or sodium polymethacrylate. Alternatively, a dispersing agent currently sold by Allied Colloids Manufacturing Company Limited as Dispex N.40 has been found to be particularly suitable.

The percentage composition by weight of the mixture to which the polymer dispersion is added is as follows:

| | Percent |
|---|---|
| Pigment | 10 to 35 |
| Filler | 30 to 50 |
| Water | 30 to 40 |
| Dispersing agent | 2 to 5 |

This mixture is ground, by any suitable means, as by a ball mill, a colloid mill, or a sand grinder, to provide a maximum pigment size of 1 to 30 microns, the preferred maximum size being in the range 1 to 10 microns. To this mixture there is added 25 to 35% by weight, of the polymer dispersion. If desired the polymer dispersion may be added to the mixture before grinding.

The coating composition so obtained is applied to an oxidised area of the polyolefin film material by any of a number of known techniques, as by silk screen printing, plain roller coating, or by gravure or reverse gravure processes, the reverse gravure process being that which is peferred. One or more applications of the coating composition may be made.

After application of the coating composition to the polyolefin film material the water is removed from the coating composition by drying in a current of air either at ambient or at an elevated temperature. Air temperatures can be in the range 20 to 100° C. but the preferred temperature is in the range 70 to 90° C. After drying the weight of the dry coating composition on the film material should be within the range 5 to 20 grams per square metre, the preferred range being 8 to 13 grams per square metre.

As mentioned above, the coating composition is applied to an oxidatively treated area of the film material and this treatment may conveniently be effected in known manner by a corona discharge. The oxidation treatment may be carried out when the film material is produced, or at any time before the coating composition is applied to the film material.

In some instances the adhesion and water resistance of the coating composition may be improved by the application to the oxidatively treated area of a primer coating before the application of the coating composition. Primers which have been found to be suitable include those of the polyethylene imine type, for example that currently sold by Badische Anilin- & Soda-Fabrik A.G. of Ludwigshafen am Rhein as Polymin P, and those of the polyurethane type, for example that currently sold by Morton Williams Limited as Adcote 31–A–37. The polyethylene imine type of primer may be applied to the film material from a water/methylated spirits solution by flexography, gravure, or plain roller coating processes followed by drying, the preferred application weight being in the range 0.05 to 0.15 gram per square metre.

The polyurethane primer is best applied to the film material by gravure or by plain roller coating followed by forced air drying. Preferred solvents are acetone, methyl ethyl ketone, or ethyl acetate. The application weight should be in the range 0.05 to 0.5 gram per square metre, the preferred range being 0.1 to 0.2 gram per square metre.

Two examples, A and B respectively, of the preparation of the coating composition will now be given.

A

| | | Parts by weight |
|---|---|---|
| Pigment | R.XL Tioxide (see above) | 30 |
| Filler | 7 ML. Whiting (obtained from the (Cement Marketing Board). | 30 |
| Water | | 30 |
| Dispersing agent | Dispex N. 40 (see above) | 2 |

This mixture was ground on a ball mill to give a maximum pigment size of 3 microns and subsequently 25 parts by weight of a vinyl acetate/alkyl acrylate polymer dispersion currently solid as Vinacryl 4501 were added with stirring.

B

Procedure A was repeated but precipitated chalk was used in place of whiting, and a vinyl acetate/alkyl acrylate polymer dispersion currently sold by Revertex Limited as Revertex A–158 was used instead of Vinacryl 4501.

Two examples of the application of the coating composition will now be given.

EXAMPLE 1

Lay-flat tubing having a width of 4¼ inches and a thickness of 2 mil was produced from an ethylene copolymer resin having a density of 0.947 and a melt flow index of 0.3. The tube was electronically oxidatively treated on one surface and the treated surface primed with a primer coating of polyethylene imine applied by a 150-line screen gravure roller from a 1.3% solution in methylated spirits. A 2-inch wide band of coating composition prepared by procedure A was then applied to the primed area using the reverse gravure technique. The applicator roller was knurled to an 80-line screen over a 2-inch wide peripheral band. After drying, the application weight of the coating composition was found to be 10.5 grams per square metre. The dried coating composition exhibited good adhesion to the film material and could not be removed by scuffing or with Sellotape (registered trademark). It was also resistant to removal with water. In subsequent tests the coating composition was found to be receptive to the "lead" or graphite of a pencil, ball-pen inks, liquid inks, stamping inks, and typewriter ribbon inks.

The coated tube was converted into bags by cutting the tube at 8½-inch intervals along its length and heat sealing each length with a heat seal to form the bottom 2 of the bag as shown in FIG. 1.

EXAMPLE 2

Polyethylene sheet material 12 inches wide having a thickness of 3 mils was produced from a resin having a density of 0.921 and a melt flow index of 1.5 and was electronically oxidatively treated on one face. After priming, as in Example 1, a 2-inch wide band of coating composition prepared by procedure B was applied to the oxidatively treated face at a position between 2 and 4 inches from one edge of the sheet. The coating composition was applied as described in Example 1.

Tests on the coating composition gave results essentially similar to those described in Example 1.

The coated material was converted into bags 1, FIG. 4, by folding the material along its longitudinal centre line, FIG. 2, and sealing, as at 5, FIGS. 3 and 4 and cutting, as at 6, FIG. 4, transversely at 4-inch intervals along the length of the folded sheet thus providing bags 4 inches wide and 6 inches long, having a 2-inch wide band of coating composition across the centre of one outer face.

In the foregoing description the coated material has been described as being converted into bags but it will be understood that, if desired, the material may be converted into envelopes.

I claim:

1. A method of producing a polyolefin film material receptive in a surface area thereof to writing media selected from the group consisting of graphite and inks consisting of the steps of:
    (a) preparing a coating composition by grinding a mixture by weight of 10 to 35% titanium dioxide pigment, 30 to 50% particulate filler, 30 to 40% water, and 2 to 5% stabilising dispersion agent to a maximum pigment size of 1 to 30 microns,
    (b) mixing with the mixture 25 to 30% polymer dispersion of a copolymer of vinyl acetate with an alkyl acrylate,
    (c) oxidising said area of the surface of the film material,
    (d) coating the oxidised area with the composition of step (b), and
    (e) drying the applied coating to provide a weight of dry coating composition in the range of 5 to 20 grams per square metre.

2. The method according to claim 1, in which the maximum pigment size is 1 to 10 microns.

3. The method according to claim 1, in which the particulate filler is a white particulate filler selected from the group consisting of china clay, precipitated chalk, talc, and whiting.

References Cited

UNITED STATES PATENTS

| | | | |
|---|---|---|---|
| 3,345,196 | 10/1967 | Goldbeck | 117—47 A |
| 3,111,418 | 11/1963 | Gilbert et al. | 117—47 A |
| 3,340,091 | 9/1967 | Zweig | 117—47 A |
| 3,135,622 | 6/1964 | Ranalli | 117—47 A |
| 2,790,736 | 4/1957 | McLaughlin et al. | 117—155 |
| 2,829,069 | 4/1958 | Michel | 117—76 |
| 3,033,811 | 5/1962 | Brown et al. | 260—29.4 |
| 3,222,211 | 12/1965 | Updegrove et al. | 117—138.8 |

WILLIAM D. MARTIN, Primary Examiner

W. R. TRENOR, Assistant Examiner

U.S. Cl. X.R.

117—76 F, 138.8 E, 161 UB